US012107433B2

(12) United States Patent
Matsubara

(10) Patent No.: US 12,107,433 B2
(45) Date of Patent: Oct. 1, 2024

(54) CONTACTLESS POWER FEEDING FACILITY

(71) Applicant: Daifuku Co., Ltd., Osaka (JP)

(72) Inventor: Hiroshi Matsubara, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/106,147

(22) Filed: Feb. 6, 2023

(65) Prior Publication Data

US 2023/0253826 A1 Aug. 10, 2023

(30) Foreign Application Priority Data

Feb. 7, 2022 (JP) ................................. 2022-017176

(51) Int. Cl.
*H02J 50/10* (2016.01)
*H02J 50/40* (2016.01)

(52) U.S. Cl.
CPC .............. *H02J 50/10* (2016.02); *H02J 50/40* (2016.02)

(58) Field of Classification Search
CPC ........ H02J 50/10; H02J 2310/48; H02J 50/12; H02J 50/40; H02J 50/80; H02J 3/08; Y02T 10/70; Y02T 10/7072; Y02T 90/14; B65G 35/00; B60L 5/005; B60M 7/00
See application file for complete search history.

(56) References Cited

U.S. PATENT DOCUMENTS 7,733,676 B2 * 6/2010 Nunoya ................ H02M 5/458
191/10

FOREIGN PATENT DOCUMENTS

JP 2001211501 A 8/2001
JP 200267747 A 3/2002

* cited by examiner

*Primary Examiner* — Jung Kim
(74) *Attorney, Agent, or Firm* — The Webb Law Firm

(57) ABSTRACT

A synchronization system for synchronizing phases of alternating currents supplied from a plurality of power supply devices includes a master unit that outputs a synchronization signal having a predetermined period. Each power supply device includes: a power supply circuit that supplies an alternating current to a power feeding line; and a power supply control unit that receives the synchronization signal and controls the power supply circuit. The power supply control unit calculates an adjusted phase by delaying a phase of the received synchronization signal by an amount corresponding to a prescribed delay time and advancing the delayed phase by an amount corresponding to a time required to transmit the synchronization signal from the master unit to the power supply control unit, and controls the power supply circuit in such as manner as to synchronize the phase of the alternating current with the adjusted phase.

6 Claims, 4 Drawing Sheets

CONTACTLESS POWER FEEDING FACILITY

CROSS-REFERENCE TO RELATED APPLICATION

This application claims priority to Japanese Patent Application No. 2022-017176 filed Feb. 7, 2022, the disclosure of which is hereby incorporated by reference in its entirety.

BACKGROUND OF THE INVENTION

1. Field of the Invention

The present invention relates to a contactless power feeding facility configured to supply power in a contactless manner to a power receiving device and including: a plurality of power feeding lines side by side along a movement path of a moving body including the power receiving device; and a plurality of power supply devices respectively connected to the power feeding lines and configured to supply alternating currents to the power feeding lines.

2. Description of the Related Art

JP 2002-67747A (hereinafter referred to as "Patent Document 1") discloses an example of such a contactless power feeding facility. In the following description of the related art, reference signs used in Patent Document 1 are cited in parentheses.

In the contactless power feeding facility disclosed in Patent Document 1, a master unit (51(A)) transmits a synchronization signal to a plurality of slave units (51). Power supply devices (M) respectively connected to the plurality of slave units (51) supply alternating currents to corresponding power feeding lines (47) based on the synchronization signal received by the slave units (51). With this configuration, phases of the alternating currents supplied to the power feeding lines (47) are synchronized.

SUMMARY OF THE INVENTION

In contactless power feeding facilities configured as described above, the time required to transmit the synchronization signal from the master unit to a power supply device depends on the manner of connection of the power supply device to the master unit. Therefore, the time required to transmit the synchronization signal from the master unit to the power supply devices may differ for each power supply device. However, the contactless power feeding facility disclosed in Patent Document 1 does not take into account such differences in the required transmission time, and, in that respect, is limited in terms of increasing the accuracy in synchronizing the phases of alternating currents supplied to the power feeding lines.

Under the above circumstances, there is demand for a contactless power feeding facility capable of increasing the accuracy in synchronizing the phases of alternating currents supplied to a plurality of power feeding lines.

A contactless power feeding facility configured in view of the above is configured to supply power in a contactless manner to a power receiving device and has a characteristic configuration including:

a plurality of power feeding lines side by side along a movement path of a moving body including the power receiving device; and a plurality of power supply devices respectively connected to the power feeding lines and configured to supply alternating currents to the power feeding lines, wherein the contactless power feeding facility further comprises a synchronization system configured to synchronize phases of the alternating currents of the plurality of power supply devices, the synchronization system includes a master unit configured to output a synchronization signal having a predetermined period, each of the plurality of power supply devices includes:
  a power supply circuit configured to supply an alternating current to the power feeding line connected to the power supply device; and
  a power supply control unit configured to receive the synchronization signal and control the power supply circuit, and in each of the power supply devices, the power supply control unit calculates an adjusted phase by delaying a phase of the received synchronization signal by an amount corresponding to a prescribed delay time and advancing the delayed phase by an amount corresponding to a time required to transmit the synchronization signal from the master unit to the power supply control unit, and controls the power supply circuit in such a manner as to synchronize the phase of the alternating current with the adjusted phase.

According to this characteristic configuration, the power supply control unit calculates the adjusted phase by delaying the phase of the received synchronization signal by an amount corresponding to the prescribed delay time and advancing the delayed phase by an amount corresponding to the time required to transmit the synchronization signal from the master unit to the power supply control unit. Then, the power supply control unit controls the power supply circuit in such a manner as to synchronize the phase of the alternating current supplied to the power feeding line with the adjusted phase. Therefore, even if the time required to transmit the synchronization signal from the master unit to the power supply control unit differs for each power supply device, it is possible to appropriately synchronize the phases of alternating currents supplied from the plurality of power supply circuits to the power feeding lines. Therefore, it is possible to increase the accuracy in synchronizing the phases of the alternating currents supplied to the power feeding lines.

DESCRIPTION OF THE INVENTION

The following describes a contactless power feeding facility 100 according to an embodiment with reference to the drawings. In the present embodiment, the contactless power feeding facility 100 is provided in an article transport facility 200.

Figure 1:
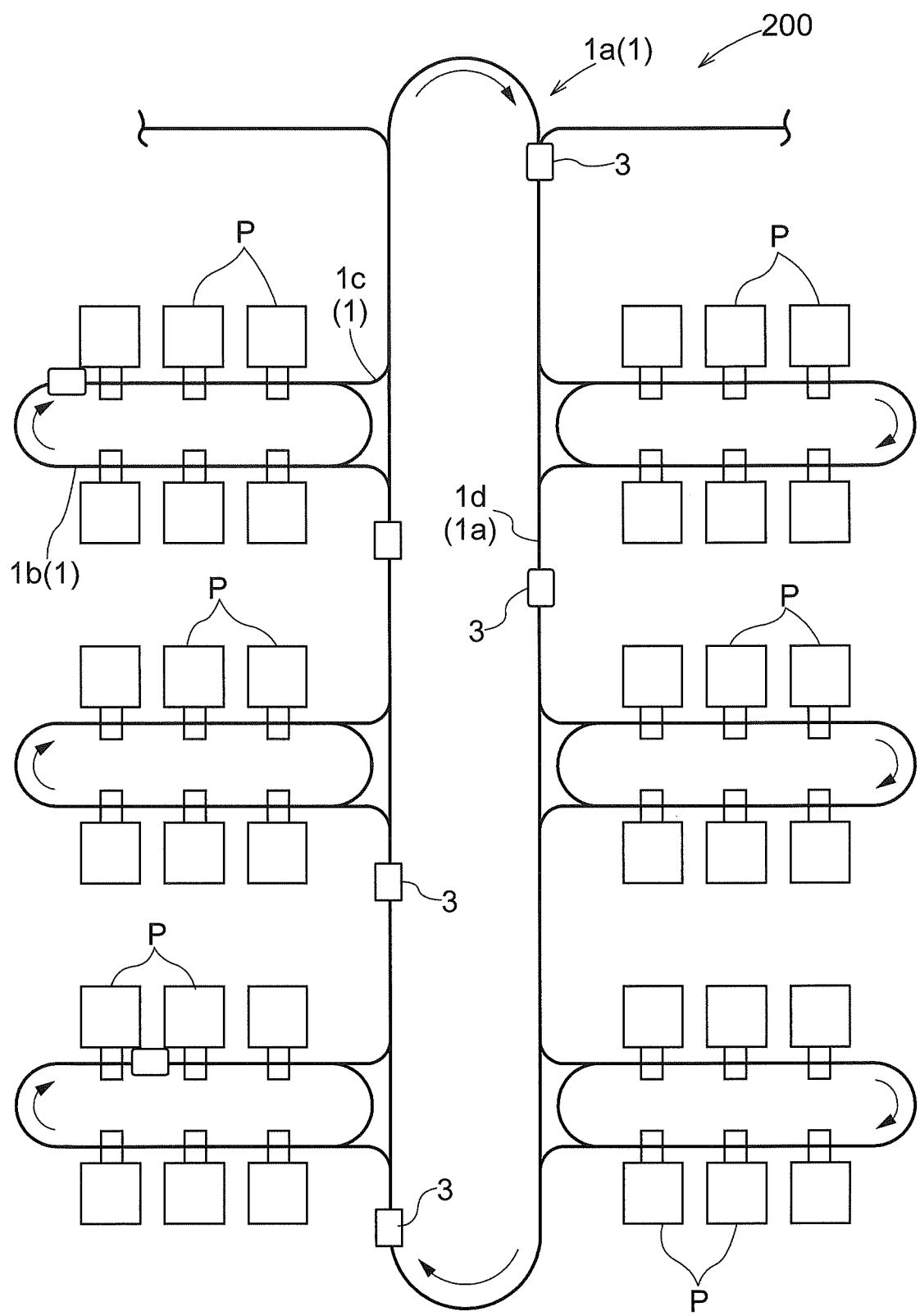
FIG. 1 is a plan view of an article transport facility including a contactless power feeding facility according to an embodiment.
Figure 2:
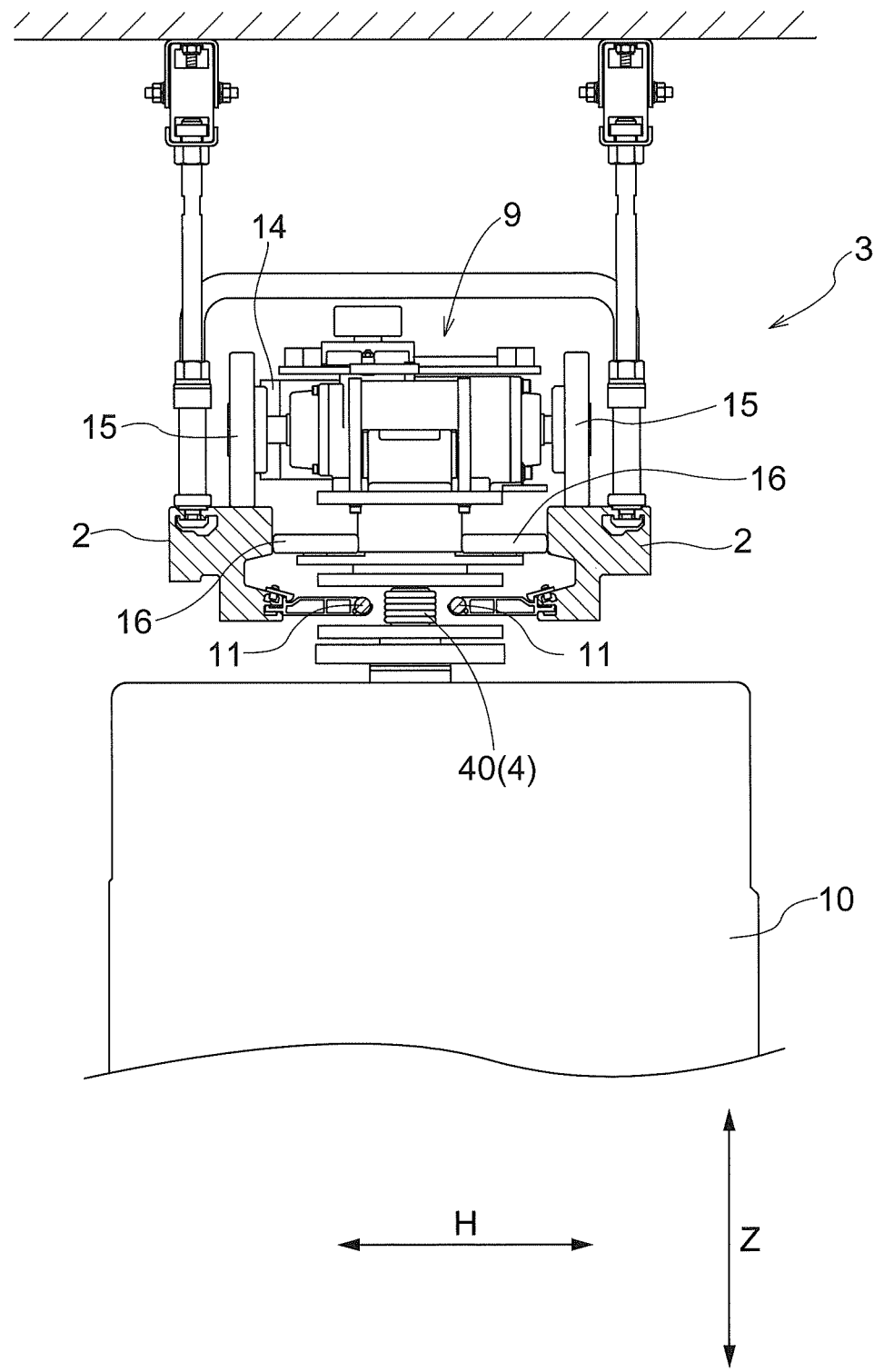
FIG. 2 is a front view of an article transport vehicle included in the article transport facility.

As shown in FIGS. 1 and 2, the article transport facility 200 includes travel rails 2 and a moving body 3. The travel rails 2 extend along a movement path 1 of the moving body 3. In the present embodiment, a pair of travel rails 2 are suspended and supported from a ceiling and are spaced apart from each other by a constant distance in a path width direction H that is orthogonal to the movement path 1 as viewed in an up-down direction Z, which is a vertical direction (see FIG. 2). In the present embodiment, the moving body 3 is an article transport vehicle configured to travel along the movement path 1 while being guided by the travel rails 2. Articles to be transported by the moving body 3 serving as the article transport vehicle are, for example, front opening unified pods (FOUPs) for housing semiconductor substrates, or glass substrates to be used as a material of a display.

As shown in FIG. 1, in the present embodiment, the movement path 1 includes one loop-shaped main path 1a, a plurality of loop-shaped sub-paths 1b each passing through a plurality of article processing sections P, and a plurality of connection paths 1c connecting the main path 1a and the sub-paths 1b.

As shown in FIG. 2, the moving body 3 includes a power receiving device 4 that receives driving power in a contactless manner from power feeding lines 11 laid out along the movement path 1. In the present embodiment, the moving body 3 further includes a traveling unit 9 that travels along the movement path 1 while being guided by the pair of travel rails 2 and a transport vehicle body 10 that is positioned below the travel rails 2 and is suspended and supported by the traveling unit 9.

The traveling unit 9 includes a drive motor 14 and a pair of travel wheels 15. The drive motor 14 is a driving power source of the pair of travel wheels 15. The pair of travel wheels 15 are driven to rotate by the drive motor 14. The travel wheels 15 roll on traveling surfaces that are constituted by upper surfaces of the travel rails 2. In the present embodiment, the traveling unit 9 further includes a pair of guide wheels 16. The pair of guide wheels 16 are supported rotatably about axes extending along the up-down direction Z. The pair of guide wheels 16 are in contact with a pair of inner side surfaces of the pair of travel rails 2 facing each other in the path width direction H.

The transport vehicle body 10 includes: an article supporter (not shown) that supports an article by suspending the article in such a manner that the article can be raised and lowered; and an actuator (not shown) for raising and lowering the article supporter.

Power to be supplied to the drive motor 14, various actuators, and the like is supplied in a contactless manner from the power feeding lines 11 to the power receiving device 4. As described above, the power feeding lines 11 for supplying the power receiving device 4 with power for driving the moving body 3 are laid out along the movement path 1. In the present embodiment, the power feeding lines 11 are disposed on both sides in the path width direction H relative to the power receiving device 4.

In the present embodiment, the power receiving device 4 includes a pick-up coil 40. Alternating-current power is induced in the pick-up coil 40 by a magnetic field generated around the power feeding lines 11 to which an alternating current is supplied. The alternating-current power is converted into direct current power by a power receiving circuit including a rectifier circuit, a smoothing capacitor, and the like, and is supplied to the drive motor 14, various actuators, and the like.

Figure 3:
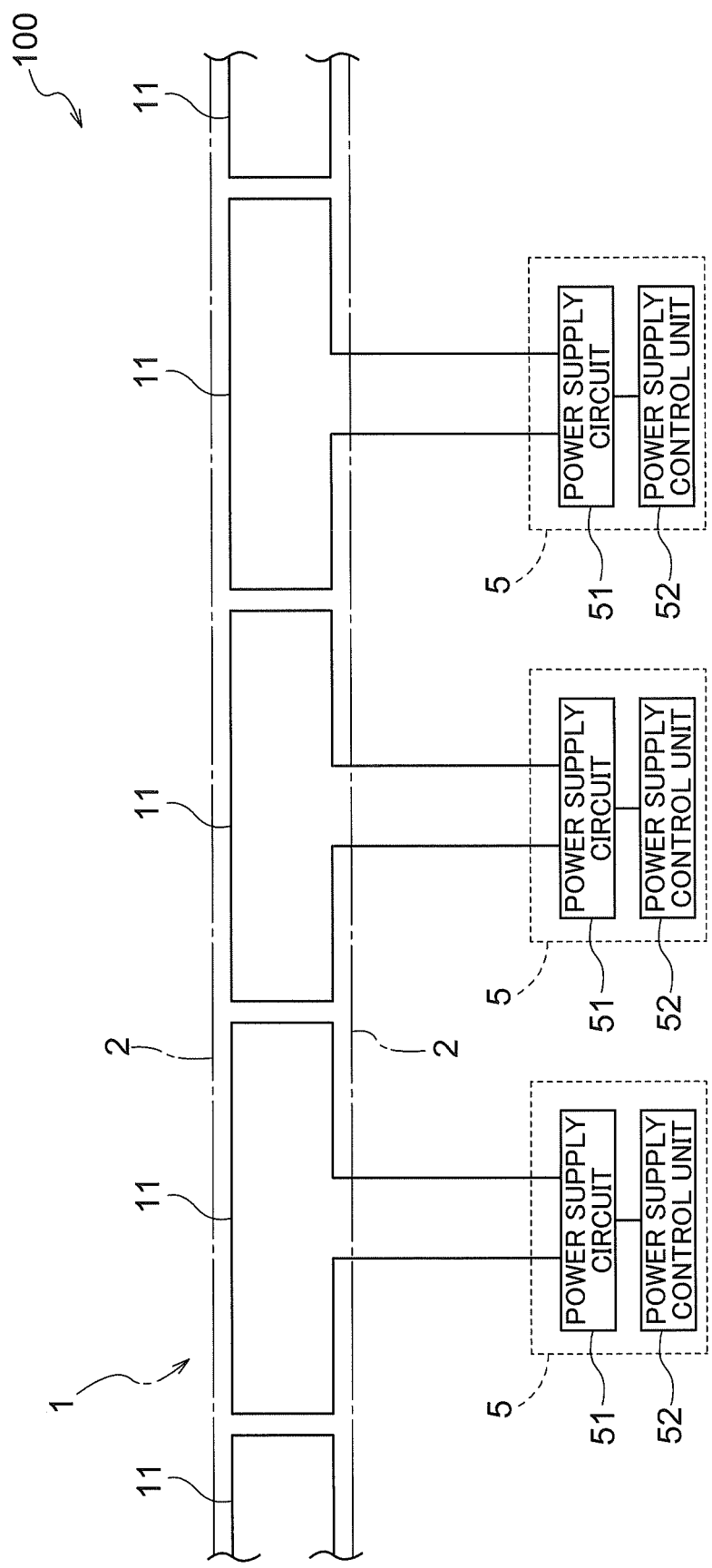
FIG. 3 is a schematic diagram showing the configuration of the contactless power feeding facility according to an embodiment.

The contactless power feeding facility 100 is configured to supply power in a contactless manner to the power receiving device 4. As shown in FIG. 3, the contactless power feeding facility 100 includes a plurality of power feeding lines 11 arranged side by side along the movement path 1 of the moving body 3 including the power receiving device 4, and a plurality of power supply devices 5 that are respectively connected to the power feeding lines 11 and supply alternating currents to the power feeding lines 11. As described above, the contactless power feeding facility 100 includes a plurality of sets of power feeding lines 11 and power supply devices 5. This is for suppressing a reduction in the power transmission efficiency in the power feeding lines 11 and preventing the entire facility from stopping in the case of failure, for example, in a relatively large-scale article transport facility such as the article transport facility 200 according to the present embodiment including the one large loop-shaped main path 1a and the plurality of loop-shaped sub-paths 1b that are smaller than the main path 1a (see FIG. 1).

Each of the plurality of power supply devices 5 includes a power supply circuit 51 that supplies an alternating current to the power feeding line 11 connected to the power supply device 5 and a power supply control unit 52 that controls the power supply circuit 51.

The power supply circuit 51 is constituted mainly by a switching power supply circuit including an inverter circuit, for example. The power supply control unit 52 controls the duty cycle of a switching control signal for switching a switching element constituting the inverter circuit, based on a command value. For example, the power supply control unit 52 causes the power supply circuit 51 to output an alternating current by pulse width modulation (PWM). Here, the command value is, for example, a current value (which may be either an effective value or a peak value (peak-to-peak value)), or a duty cycle of PWM control.

Figure 4:
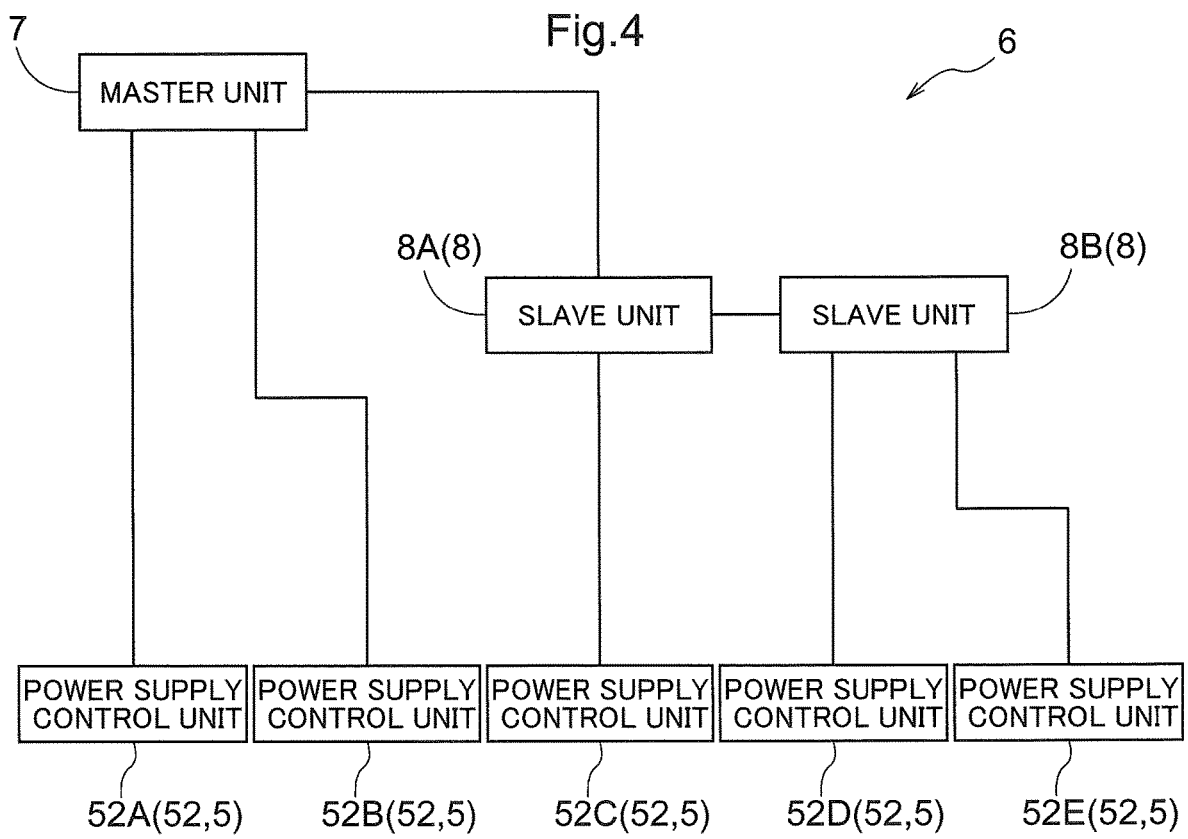
FIG. 4 is a diagram showing an example of the configuration of a synchronization system.

As shown in FIG. 4, the contactless power feeding facility 100 further includes a synchronization system 6 configured to synchronize phases of alternating currents supplied from the plurality of power supply devices 5. The synchronization system 6 includes a master unit 7 configured to output a synchronization signal having a predetermined period. In the present embodiment, the synchronization system 6 further includes at least one slave unit 8 that receives the synchronization signal from the master unit 7.

The slave unit 8 is directly connected to the master unit 7, or indirectly connected to the master unit 7 via another slave unit 8. Furthermore, the slave unit 8 is connected to at least one power supply device 5. The slave unit 8 transmits the synchronization signal received by the slave unit 8 to the power supply device 5 connected to the slave unit 8. More specifically, the slave unit 8 is connected to the power supply control unit 52 of at least one power supply device 5. The slave unit 8 transmits the synchronization signal received by the slave unit 8 to the power supply control unit 52 connected to the slave unit 8. The power supply control unit 52 receives the synchronization signal from the slave unit 8 connected to the power supply control unit 52.

In the present embodiment, the master unit 7 is also connected to at least one power supply device 5. The master unit 7 transmits the synchronization signal to the power supply device 5 connected to the master unit 7. More specifically, the master unit 7 is connected to the power supply control unit 52 of at least one power supply device 5.

The master unit 7 transmits the synchronization signal to the power supply control unit 52 connected to the master unit 7. The power supply control unit 52 receives the synchronization signal from the master unit 7 connected to the power supply control unit 52.

In the example shown in FIG. 4, the synchronization system 6 includes two slave units 8. In the following description, the two slave units 8 will be referred to as a "first slave unit 8A" and a "second slave unit 8B". The first slave unit 8A is directly connected to the master unit 7. The second slave unit 8B is indirectly connected to the master unit 7 via the first slave unit 8A.

In the example shown in FIG. 4, two power supply control units 52 are connected to the master unit 7. One power supply control unit 52 is connected to the first slave unit 8A. Two power supply control units 52 are connected to the second slave unit 8B. In the following description, the two power supply control units 52 connected to the master unit 7 will be referred to as a "first power supply control unit 52A" and a "second power supply control unit 52B". The power supply control unit 52 connected to the first slave unit 8A will be referred to as a "third power supply control unit 52C". The two power supply control units 52 connected to the second slave unit 8B will be referred to as a "fourth power supply control unit 52D" and a "fifth power supply control unit 52E".

Each power supply control unit 52 calculates an adjusted phase α1 by delaying the phase of the received synchronization signal by an amount corresponding to a prescribed delay time Td and advancing the delayed phase by an amount corresponding to an adjustment time Ta that corresponds to a time required to transmit the synchronization signal from the master unit 7 to the power supply control unit 52. The power supply control unit 52 controls the power supply circuit 51 in such a manner as to synchronize the phase of an alternating current supplied from the power supply circuit 51 to the power feeding line 11 with the adjusted phase α1.

In the present embodiment, the power supply control unit 52 calculates the adjusted phase α1 based on the following formula.

$$\alpha1=\alpha0-(Td-Ta)$$

α1: Adjusted phase
α0: Phase of synchronization signal received by the power supply control unit 52
Td: Delay time
Ta: Adjustment time In the present embodiment, the adjustment time Ta is calculated based on the following formula.

$$Ta=1/Vs \times Lt+Ns \times Ts$$

Vs: Transmission speed of synchronization signal
Lt: Length of transmission path of synchronization signal from the master unit 7 to the power supply control unit 52
Ts: Time required to process synchronization signal in each slave unit 8
Ns: Number (count) of slave units 8 between the master unit 7 and the power supply control unit 52

That is, in the present embodiment, the power supply control unit 52 calculates the adjusted phase α1 based on the following formula.

$$\alpha1=\alpha0-\{Td-(1/Vs \times Lt+Ts \times Ns)\}$$

As shown above, the longer the length Lt of the transmission path of the synchronization signal from the master unit 7 to the power supply control unit 52 is, the longer the adjustment time Ta becomes, and the larger the number Ns of slave units 8 between the master unit 7 and the power supply control unit 52 is, the longer the adjustment time Ta becomes. Note that the transmission speed Vs of the synchronization signal is a fixed value that depends on the type of electric wire constituting the transmission path of the synchronization signal, for example.

Here, the same value is used as the delay time Td in calculation of the adjusted phase α1 by each power supply control unit 52. Accordingly, the longer the length Lt of the transmission path of the synchronization signal from the master unit 7 to the power supply control unit 52 is, the shorter the time (Td−Ta) by which the phase α0 of the synchronization signal is delayed in calculation of the adjusted phase α1 becomes, and the larger the number Ns of slave units 8 between the master unit 7 and the power supply control unit 52 is, the shorter the time (Td−Ta) becomes.

In the example shown in FIG. 4, the length Lt of the transmission path of the synchronization signal from the master unit 7 increases in the order of the first power supply control unit 52A, the second power supply control unit 52B, the third power supply control unit 52C, the fourth power supply control unit 52D, and the fifth power supply control unit 52E. Accordingly, the time required to transmit the synchronization signal from the master unit 7 increases in the order of the first power supply control unit 52A, the second power supply control unit 52B, the third power supply control unit 52C, the fourth power supply control unit 52D, and the fifth power supply control unit 52E. That is, when out of the plurality of power supply control units 52, a power supply control unit 52 for which the longest time is required to transmit the synchronization signal from the master unit 7 is referred to as a "most-delayed power supply control unit", the fifth power supply control unit 52E is the most-delayed power supply control unit. Note that there may be a power supply control unit 52 for which the length Lt of the transmission path of the synchronization signal from the master unit 7 is substantially zero (in other words, a power supply control unit 52 for which the length Lt can be taken as zero).

In the example shown in FIG. 4, the third power supply control unit 52C is connected to the master unit 7 via the first slave unit 8A. Therefore, the time required to transmit the synchronization signal from the master unit 7 to the third power supply control unit 52C includes a time Ts required to process the synchronization signal in the single slave unit 8 (the first slave unit 8A) (Ns=1). The fourth power supply control unit 52D and the fifth power supply control unit 52E are each connected to the master unit 7 via the first slave unit 8A and the second slave unit 8B. Therefore, the time required to transmit the synchronization signal from the master unit 7 to the fourth power supply control unit 52D and the time required to transmit the synchronization signal from the master unit 7 to the fifth power supply control unit 52E each include a time Ts required to process the synchronization signal in the two slave units 8 (the first slave unit 8A and the second slave unit 8B) (Ns=2).

Figure 5:
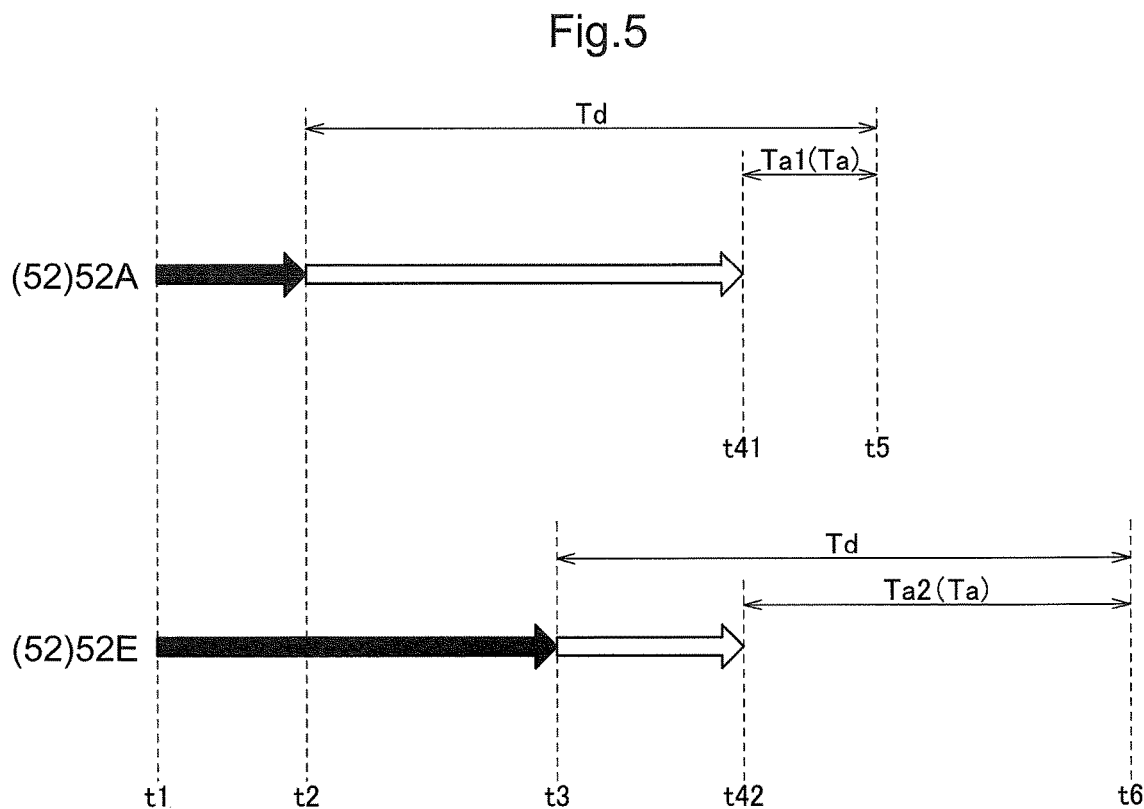
FIG. 5 is a diagram showing calculation of adjusted phases by a power supply control unit.

FIG. 5 illustrates calculation of the adjusted phase α1 by the first power supply control unit 52A and calculation of the adjusted phase α1 by the fifth power supply control unit 52E in comparison with each other. Each black-colored arrow shown in FIG. 5 represents the time required to transmit the synchronization signal from the master unit 7 to the power supply control unit 52 corresponding to the reference sign shown on the left. Each outlined arrow represents a time from when the synchronization signal transmitted from the master unit 7 is received by the power supply control unit 52 corresponding to the reference sign shown on the left to when the power supply control unit 52 controls the power supply circuit 51 to supply an alternating current to the power feeding line 11.

As shown in FIG. 5, the master unit 7 transmits the synchronization signal at a time point t1. The first power supply control unit 52A receives the synchronization signal from the master unit 7 at a time point t2, and the fifth power supply control unit 52E receives the synchronization signal from the master unit 7 at a time point t3 later than the first power supply control unit 52A. This is because the fifth power supply control unit 52E is the most-delayed power supply control unit, and the time required to transmit the synchronization signal from the master unit 7 to the fifth power supply control unit 52E is longer than the time required to transmit the synchronization signal from the master unit 7 to the first power supply control unit 52A as described above.

The first power supply control unit 52A and the fifth power supply control unit 52E, which have received the synchronization signal from the master unit 7, each calculate the adjusted phase α1 based on the formula shown above. The first power supply control unit 52A calculates a time point t41 that corresponds to the adjusted phase α1 advanced by a first adjustment time Ta1 from a time point t5 corresponding to a phase that is delayed by the delay time Td from the time point t2 corresponding to the phase α0 of the synchronization signal received by the first power supply control unit 52A. The fifth power supply control unit 52E calculates a time point t42 that corresponds to the adjusted phase α1 advanced by a second adjustment time Ta2 from a time point t6 corresponding to a phase that is delayed by the delay time Td from the time point t3 corresponding to the phase α0 of the synchronization signal received by the fifth power supply control unit 52E.

Here, the first adjustment time Ta1 is an adjustment time Ta calculated by the first power supply control unit 52A. That is, the first adjustment time Ta1 corresponds to the time (from the time point t1 to the time point t2) required to transmit the synchronization signal from the master unit 7 to the first power supply control unit 52A. Also, the second adjustment time Ta2 is an adjustment time Ta calculated by the fifth power supply control unit 52E. That is, the second adjustment time Ta2 corresponds to the time (from the time point t1 to the time point t3) required to transmit the synchronization signal from the master unit 7 to the fifth power supply control unit 52E. Accordingly, the time point t41 advanced by the first adjustment time Ta1 from the time point t5 delayed by the delay time Td from the time point t2 at which the first power supply control unit 52A receives the synchronization signal from the master unit 7 is very close to the time point t42 advanced by the second adjustment time Ta2 from the time point t6 delayed by the delay time Td from the time point t3 at which the fifth power supply control unit 52E receives the synchronization signal from the master unit 7. That is, the timing at which the first power supply control unit 52A controls the power supply circuit 51 to supply an alternating current to the power feeding line 11 can be synchronized with the timing at which the fifth power supply control unit 52E controls the power supply circuit 51 to supply an alternating current to the power feeding line 11. This applies to the other power supply control units 52 as well, and therefore, it is possible to appropriately synchronize the phases of alternating currents supplied from the plurality of power supply circuits 51 to the power feeding lines 11.

Note that, in the present embodiment, the delay time Td is set to be longer than or equal to the time (from the time point t1 to the time point t3) required to transmit the synchronization signal from the master unit 7 to the fifth power supply control unit 52E, which is the most-delayed power supply control unit.

Other Embodiments (1) In the above embodiment, a configuration is described as an example in which the synchronization system 6 includes two slave units 8 (the first slave unit 8A and the second slave unit 8B). However, there is no limitation to this configuration, and a configuration is also possible in which the synchronization system 6 includes a single slave unit 8 or three or more slave units 8. Alternatively, a configuration is also possible in which the synchronization system 6 includes no slave unit 8.

(2) In the above embodiment, a configuration is described as an example in which a single power supply device 5 (specifically, the third power supply control unit 52C) is connected to the first slave unit 8A and two power supply devices 5 (specifically, the fourth power supply control unit 52D and the fifth power supply control unit 52E) are connected to the second slave unit 8B. However, there is no limitation to this configuration, and a configuration is also possible in which three or more power supply devices 5 are connected to a slave unit 8.

(3) In the above embodiment, a configuration is described as an example in which two power supply devices 5 (specifically, the first power supply control unit 52A and the second power supply control unit 52B) are directly connected to the master unit 7. However, there is no limitation to this configuration, and a configuration is also possible in which a single power supply device 5 is directly connected to the master unit 7 or three or more power supply devices 5 are directly connected to the master unit 7. Alternatively, a configuration is also possible in which no power supply device 5 is directly connected to the master unit 7.

(4) Note that the configurations disclosed in the above embodiments may also be applied in combination with configurations disclosed in other embodiments so long as no contradiction arises. The embodiments disclosed in the present specification including the other configurations are merely examples in all aspects. Therefore, various modifications can be made as appropriate without departing from the gist of the present disclosure.

SUMMARY OF THE EMBODIMENTS

The following describes a summary of the contactless power feeding facility described above.

A contactless power feeding facility configured to supply power in a contactless manner to a power receiving device, including:
- a plurality of power feeding lines side by side along a movement path of a moving body including the power receiving device; and
- a plurality of power supply devices respectively connected to the power feeding lines and configured to supply alternating currents to the power feeding lines,
- wherein the contactless power feeding facility further comprises a synchronization system configured to synchronize phases of the alternating currents of the plurality of power supply devices, the synchronization system includes a master unit configured to output a synchronization signal having a predetermined period, each of the plurality of power supply devices includes:
a power supply circuit configured to supply an alternating current to the power feeding line connected to the power supply device; and
a power supply control unit configured to receive the synchronization signal and control the power supply circuit, and in each of the power supply devices, the power supply control unit calculates an adjusted phase by delaying a phase of the received synchronization signal by an amount corresponding to a prescribed delay time and advancing the delayed phase by an amount corresponding to a time required to transmit the synchronization signal from the master unit to the power supply control unit, and controls the power supply circuit in such a manner as to synchronize the phase of the alternating current with the adjusted phase.

According to this configuration, the power supply control unit calculates the adjusted phase by delaying the phase of the received synchronization signal by an amount corresponding to the prescribed delay time and advancing the delayed phase by an amount corresponding to the time required to transmit the synchronization signal from the master unit to the power supply control unit. Then, the power supply control unit controls the power supply circuit in such a manner as to synchronize the phase of the alternating current supplied to the power feeding line with the adjusted phase. Therefore, even if the time required to transmit the synchronization signal from the master unit to the power supply control unit differs for each power supply device, it is possible to appropriately synchronize the phases of alternating currents supplied from the plurality of power supply circuits to the power feeding lines. Therefore, it is possible to increase the accuracy in synchronizing the phases of the alternating currents supplied to the power feeding lines.

Here, it is preferable that the synchronization system further includes at least one slave unit configured to receive the synchronization signal from the master unit, the at least one slave unit is directly connected to the master unit, or indirectly connected to the master unit via another slave unit, and the at least one slave unit is further connected to at least one of the power supply devices and is configured to transmit the received synchronization signal to the at least one power supply device.

According to this configuration, even if the plurality of power supply devices are disposed over a relatively wide area, for example, the synchronization signal output from the master unit can be appropriately transmitted via the slave unit. Therefore, even in this case, it is possible to increase the accuracy in synchronizing the phases of alternating currents supplied to the power feeding lines.

In the configuration in which the synchronization system includes the at least one slave unit, it is preferable that each of the power supply control units calculates the adjusted phase based on the following formula, $$\alpha 1 = \alpha 0 - \{Td - (1/Vs \times Lt + Ts \times Ns)\}$$

where
$\alpha 1$ is the adjusted phase,
$\alpha 0$ is the phase of the synchronization signal received by the power supply control unit,
Td is the delay time,
Vs is a transmission speed of the synchronization signal,
Lt is a length of a transmission path of the synchronization signal from the master unit to the power supply control unit,
Ts is a time required to process the synchronization signal in the at least one slave unit, and
Ns is a count of the at least one slave unit between the master unit and the power supply control unit.

According to this configuration, it is possible to precisely calculate the adjusted phase. Therefore, it is possible to further increase the accuracy in synchronizing the phases of alternating currents supplied from the power supply devices based on the adjusted phase.

It is preferable that the delay time is longer than or equal to a time required to transmit the synchronization signal from the master unit to a most-delayed power supply control unit that is, out of the plurality of power supply control units, a power supply control unit for which a longest time is required to transmit the synchronization signal from the master unit.

According to this configuration, it is possible to avoid a situation in which the phase of an alternating current supplied from a power supply circuit controlled by the most-delayed power supply control unit shifts from phases of alternating currents supplied from the other power supply circuits. Therefore, it is possible to precisely synchronize the phases of alternating currents supplied from all the power supply devices.

INDUSTRIAL APPLICABILITY

The technology according to the present disclosure is applicable to a contactless power feeding facility configured to supply power in a contactless manner to a power receiving device and including: a plurality of power feeding lines side by side along a movement path of a moving body including the power receiving device; and a plurality of power supply devices respectively connected to the power feeding lines and configured to supply alternating currents to the power feeding lines.

What is claimed is:
1. A contactless power feeding facility configured to supply power in a contactless manner to a power receiving device, the contactless power feeding facility comprising:
a plurality of power feeding lines side by side along a movement path of a moving body including the power receiving device; and
a plurality of power supply devices respectively connected to the power feeding lines and configured to supply alternating currents to the power feeding lines, and
wherein:
the contactless power feeding facility further comprises a synchronization system configured to synchronize phases of the alternating currents of the plurality of power supply devices,
the synchronization system comprises a master unit configured to output a synchronization signal having a predetermined period,
each of the plurality of power supply devices comprises:
a power supply circuit configured to supply an alternating current to the power feeding line connected to the power supply device; and
a power supply control unit configured to receive the synchronization signal and control the power supply circuit, and in each of the power supply devices, the power supply control unit calculates an adjusted phase by delaying a phase of the received synchronization signal by an amount corresponding to a prescribed delay time and advancing the delayed phase by an amount corresponding to a time required to transmit the synchronization signal from the master unit to the power supply control unit, and controls the power supply circuit in such a manner as to synchronize the phase of the alternating current with the adjusted phase.

2. The contactless power feeding facility according to claim 1, wherein:

the synchronization system further comprises at least one slave unit configured to receive the synchronization signal from the master unit, the at least one slave unit is directly connected to the master unit, or indirectly connected to the master unit via another slave unit, and the at least one slave unit is further connected to at least one of the power supply devices and is configured to transmit the received synchronization signal to the at least one power supply device.

3. The contactless power feeding facility according to claim 2, wherein each of the power supply control units calculates the adjusted phase based on the following formula:

$$\alpha1=\alpha0-\{Td-(1/Vs\times Lt+Ts\times Ns)\}$$

where $\alpha1$ is the adjusted phase, $\alpha0$ is the phase of the synchronization signal received by the power supply control unit, Td is the delay time, Vs is a transmission speed of the synchronization signal, Lt is a length of a transmission path of the synchronization signal from the master unit to the power supply control unit, Ts is a time required to process the synchronization signal in the at least one slave unit, and Ns is a count of the at least one slave unit between the master unit and the power supply control unit.

4. The contactless power feeding facility according to claim 1, wherein the delay time is longer than or equal to a time required to transmit the synchronization signal from the master unit to a most-delayed power supply control unit that is, out of the plurality of power supply control units, a power supply control unit for which a longest time is required to transmit the synchronization signal from the master unit.

5. The contactless power feeding facility according to claim 2, wherein the delay time is longer than or equal to a time required to transmit the synchronization signal from the master unit to a most-delayed power supply control unit that is, out of the plurality of power supply control units, a power supply control unit for which a longest time is required to transmit the synchronization signal from the master unit.

6. The contactless power feeding facility according to claim 3, wherein the delay time is longer than or equal to a time required to transmit the synchronization signal from the master unit to a most-delayed power supply control unit that is, out of the plurality of power supply control units, a power supply control unit for which a longest time is required to transmit the synchronization signal from the master unit.

\* \* \* \* \*